US006722766B1

United States Patent
Myette

(10) Patent No.: US 6,722,766 B1
(45) Date of Patent: Apr. 20, 2004

(54) EYEWEAR WITH ATTACHED WIPING APPARATUS

(76) Inventor: Mary C. Myette, 4160 Post Rd. #28, East Greenwich, RI (US) 02818

( * ) Notice: Subject to any disclaimer, the term of this patent is extended or adjusted under 35 U.S.C. 154(b) by 12 days.

(21) Appl. No.: 10/335,157

(22) Filed: Dec. 31, 2002

(51) Int. Cl.$^7$ .................................................. G02C 1/00
(52) U.S. Cl. ......................................... 351/158; 351/41
(58) Field of Search ................ 351/158, 41; 15/250.001

(56) References Cited

U.S. PATENT DOCUMENTS 2,888,703 A * 6/1959 Karwowska ............. 15/250.27

* cited by examiner

Primary Examiner—Hung X. Dang

(57) ABSTRACT

The self-cleaning eyeglasses are an invention that provides an efficient and convenient means for cleaning the surface of lenses without removing the eyeglasses from the face of the wearer. In order to accomplish this the present invention includes a novel design for a housing shaped to seat a watch battery and formed within the frame of the eyeglasses. Also introduced by the present invention is a dual motor design wherein each motor is housed in the frames of the eyeglasses above the lenses of the eyeglasses. The motors rotate a shaft over a fixed acute angle. Attached to the shafts of the motors are wiper arms held flush to the surface of the lenses. Also housed within the frames is an On\Off switch. When the switch is activated the watch battery will supply current to the motors which will drive the shaft to sweep the wiper arms over the lenses.

14 Claims, 3 Drawing Sheets

EYEWEAR WITH ATTACHED WIPING APPARATUS

BACKGROUND OF THE INVENTION

1. Field of the Invention

The present invention relates to an improvement in eyeglasses that enables the wearer to remove moisture or other detritus from the surface of lenses without removing said eyeglasses. The mechanisms employed by the present invention will accomplish this in a cost effective and efficient manner.

2. Description of the Prior Art

One of the greatest inconveniences related to the use of eyeglasses is the need for regular cleaning to maintain adequate vision. Most wearers will have to remove and clean their glasses several times a day. This is normally done with a cloth specially designed for cleaning lenses or by using one of several cleaning fluids on the market. This can be very inconvenient since the wearer has to carry one of these items with them. In addition, when weather conditions are poor, eyeglasses may need wiping so often that it would be impractical. For example, when it is raining the lenses will constantly be exposed to water and no amount of wiping by hand will afford the wearer clear vision for sustained time. This can render people with poor vision virtually helpless when exposed to such conditions. Thus a design that would incorporate a mechanism for cleaning lenses automatically while being worn would greatly improve the field of vision enhancing eyewear.

The most efficient mechanism for cleaning glass to maintain translucence is a wiper. Tins mechanism includes a malleable material such as rubber, mounted on an arm that is held so that the material is flush with the glass. The material is then swept across the surface of the glass removing any unwanted materials on the surface. While there are a variety of designs in the prior art, which attempt to make it possible for eyeglass wearers to use this mechanism, none of these designs are as efficient or convenient as the present invention. The present invention represents a novel design that will facilitate cost effective production. It will also allow the mechanism to be relatively inconspicuous.

U.S. Pat. No. 3,754,298 to Raymond Louis Menil is for a pair of glasses that incorporate wipers. The design for these glasses comprises a motor located at the center of the frames. This motor comprises a cam that drives a gear. As the gear rotates it shifts a top-mounting arm back and forth. There are wiper arms mounted at either end of the top-mounting arm, which sweep back and forth on a pivot as the mounting arm pushes them back and forth. The motor is wired to a battery that is stored at a location outside of the frames. This design requires a large cumbersome compartment located at the center of the glasses which would be highly unattractive. It is also awkward since the battery would have to be stored elsewhere. Furthermore the wipers mounted in the center of the lens will be highly visible. While this design may be appropriate for a novelty item, it would be highly impractical for everyday use. This design also incorporates several more moving parts then the present invention, which would increase risk of wear and tear as well as increase the cost of production.

The eyeglass wiper design in U.S. Pat. No. 4,342,128 to Thomas P. Doyle is for a wiper that is not attached to the eyeglasses at all. It is a squeegee-like wiper that is attached to a chain or thread and is worn by the user separate of the glasses. When the wearer wants to use the wiper to clean their glasses, they must grasp the wiper and manually swipe the wiper across the surface of the lenses. This is much more inconvenient then the internal wiper design of the present invention since the wearer would have to carry separate item. It also would not be practical if the wearer were involved in a task that required use of both hands.

U.S. Pat. No. 4,789,233 to Edna M. Arsenault is for a wiper mechanism that is entirely manually driven. The wearer grasps a knob located at the pivot point of the wiper so that the wearer can rotate the knob back and forth causing the wiper to sweep across the surface of the lenses. This once again would not be practical if the wearer needs to use both hands for other tasks. Furthermore this design would require noticeable knobs protruding in front of the glasses, which would be highly unattractive.

U.S. Pat. No. 5,755,524 is for a portable cleaning device that may be carried to clean eyeglasses. The inconvenience of having to carry an extra item is not alleviated by this device. While it employs wipers for its cleaning mechanism, these wipers are not incorporated in the design of eyeglasses. Nor are these wipers automated, requiring the manual movement of the wipers in the cleaning action of the device.

In U.S. Pat. No. 5,946,071 a pair of eyeglasses is disclosed that includes a mechanism for illumination. As with the present invention, the Feldman '071 patent comprises a battery operated device. However, in the Feldman '071 design the battery is stored on the arm of the eyeglasses rather then the lens frame. This design requires the wiring of the device to pass through the joint of the eyeglasses and will eventually lead to wear and tear on the wire. Also, the lighting mechanism does not incorporate a motor driven system as with the present invention. Nothing in the design of the Feldman '072 patent will address the need for a cleaning mechanism; rather its sole purpose is to provide illumination.

U.S. Des. Pat. No. 421,040 to Joseph L. Berke is for a pair of glasses that incorporates arms that pivot from the center of the glasses and mount mirrors. The mirrors may be situated so that the wearer may see behind him while looking forward. The Berke '040 design does disclose a pair of eyeglasses that incorporate a separate mechanism. This mechanism however is not designed for cleaning. Nor is this mechanism automated; rather the wearer must mechanically operate it.

Therefore a need exists for a novel and enhanced device for cleaning eyeglasses. Making this action automated would allow the wearer to maintain use of their hands in all conditions and eliminate the need for carrying extra items. In this respect, the eyewear with attached wiping apparatus according to the present invention substantially depart from the conventional concepts and designs of the prior art, and in doing so provide an apparatus primarily developed for the purpose of cleaning eyeglasses.

SUMMARY OF THE INVENTION

In view of the foregoing disadvantages inherent in the known types of devices for cleaning eyeglasses now present in the prior arts the present invention provides an improved combination of convenience and utility, and overcomes the abovementioned disadvantages and drawbacks of the prior art. As such, the general purpose of the present invention, which will be described subsequently in greater detail, is to provide a new and improved design for eyewear with attached wiping apparatus which has all of the advantages of the prior art mentioned heretofore and many novel features that result in eyewear with attached wiping apparatus which are not anticipated, rendered obvious, suggested, or even implied by the prior art, either alone or in combination thereof In furtherance of this objective the eyewear with attached wiping apparatus comprise a power source. A connection from said power source to a motor mounted within said eyeglasses. An arm mounted at a right angle to the shaft of said motor is flush with the surface of the lens of said glasses.

The abovementioned power source may in addition be a battery, which may be stored in a compartment integral to said eyeglasses. Said compartment may in addition be located at the joint between the arms of said eyeglasses and the frame of said eyeglasses.

Said eyeglasses may in addition comprise a power switch intermediate to the connection between said motors and said battery so that the wearer may control the power access of the battery to the motor.

Another feature of the present invention is that said arms may be attached to said shaft of said motor at the outer corners of the frames of said eyeglasses.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved eyewear with attached wiping apparatus that have all of the advantages of the prior art and none of the disadvantages.

It is another object of the present invention to provide new and improved eyewear with attached wiping apparatus that may be easily and efficiently manufactured and marketed.

An even further object of the present invention is to provide new and improved eyewear with attached wiping apparatus that have a low cost of manufacture with regard to both materials and labor, and which accordingly are then susceptible of low prices of sale to the consuming public, thereby making such eyewear with attached wiping apparatus economically available to the buying public.

Still another object of the present invention is to provide new eyewear with attached wiping apparatus that provide in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
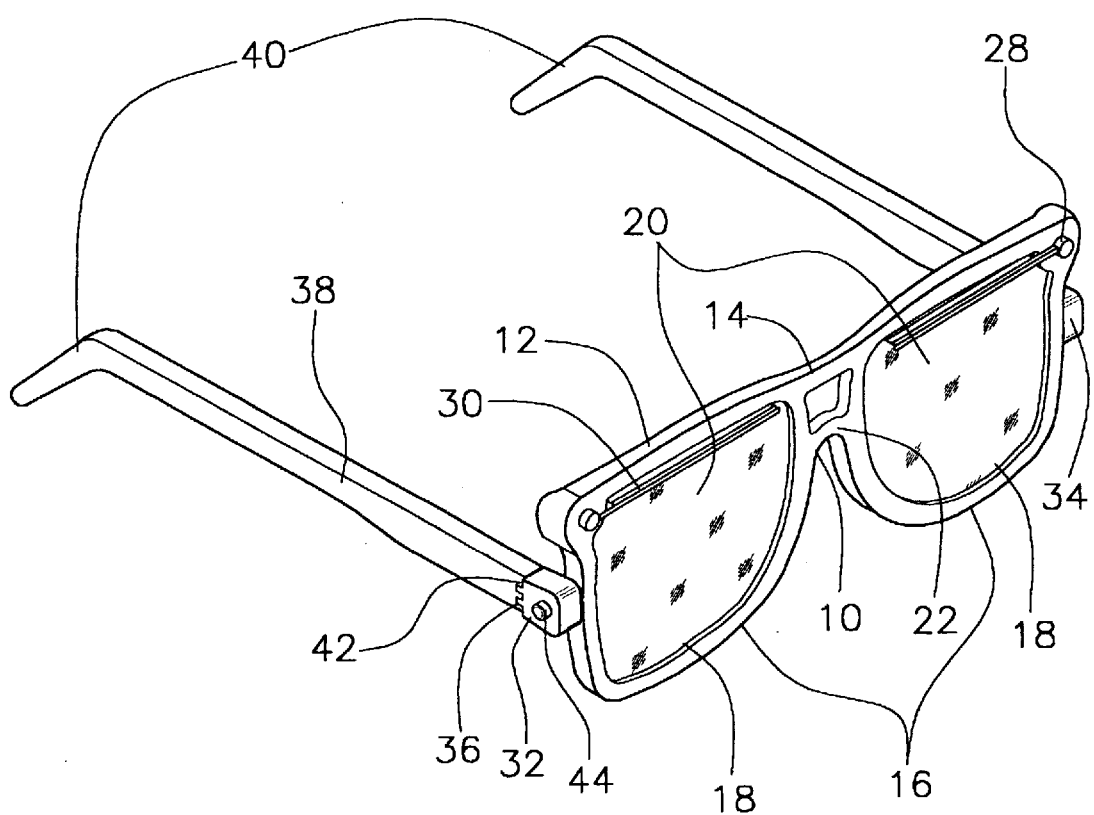
FIG. 1 is a top perspective view of the preferred embodiment of the eyewear with attached wiping apparatus of the present invention.

Referring now to the drawings, and particularly to FIGS. 1–4, a preferred embodiment of the eyewear with attached wiping apparatus of the present invention is shown and generally designated by the reference numeral 10.

In FIG. 1 is a lens frame 12 comprising a top beam 14. Connected to the lower surface of said beam 14 is a first and a second curved member 16, the ends of which are mounted to said beam 14. Said beam 14 and said curved members 16 join to define openings 18. Mounted within said opening are lenses 20. Following the standard design for lens frames, the present invention comprises slits on the surface adjacent to said opening 18 so that said lenses 20 may be seated within said slits. The present invention further comprises a curved bar 22, the ends of which are mounted between said curved members. When the self-cleaning glasses are worn said curved bar 22 rests on the wearer's nose preventing said eyeglasses 10 from sliding down. Attached to said lens frame 12 at the outer union of said curved members and said top beam is a cylindrical housing 24. Mounted within said housing 24 is a wiper motor 26. Said motor 26 may be one that comprises a shaft, said shaft being driven in a periodic rotational motion covering a fixed angle. An example of a motor that would produce this motion is the worm gear design of several single arm wiper motors on the market. Said cylindrical housing 24 is shaped to define a hole 28 on the front end of said housing. Said shaft passes through said hole 28 and protrudes on the face of the present invention Attached to said shaft is an arm 30 which may be made of plastic. Said arm 30 is held at a right angle to said shaft and adjacent to the top front surface of said lenses 20. The angle of rotation of said shaft covers the angle required for said arm 30 to proceed from said top edge of said lenses 20 to traverse the entire surface of said lenses. In order to improve the cleaning action of said arm 30 various materials may be attached to said arm that will seal the gap between said arm and said lens 20 to prevent moisture from sliding through. Rubber or cloth would be examples of suitable material. Attached to the outer edge of said curved members are a first 32 and a second 34 eyeglass arm mount. Said mounts comprise a housing. Said mounts further comprise a pair of fingers 36. Said fingers comprise a hole. The present invention also comprises a pair of eyeglass arms 38 of the standard design. This design comprises a curved member 40 at the end of said arms designed to rest on the wearer's ears. Attached to the other end of said arms 38 are three fingers 42, which further comprise holes. When said arm fingers 42 and said mount fingers 36 are placed in an interlocking position, said holes in said fingers form a bore. The present invention further comprises an axle said axle passing through said bore. This design allows said eyeglass arms 38 to be rotated about said axle from a closed position to an open position for easy storage. The first of said arm mount housing 32 comprises a hole. Mounted within said housing is an On/Off switch 44. Said button 44 is of the standard design allowing the wearer to control the flow of current in a simple DC current circuit.

Figure 2:
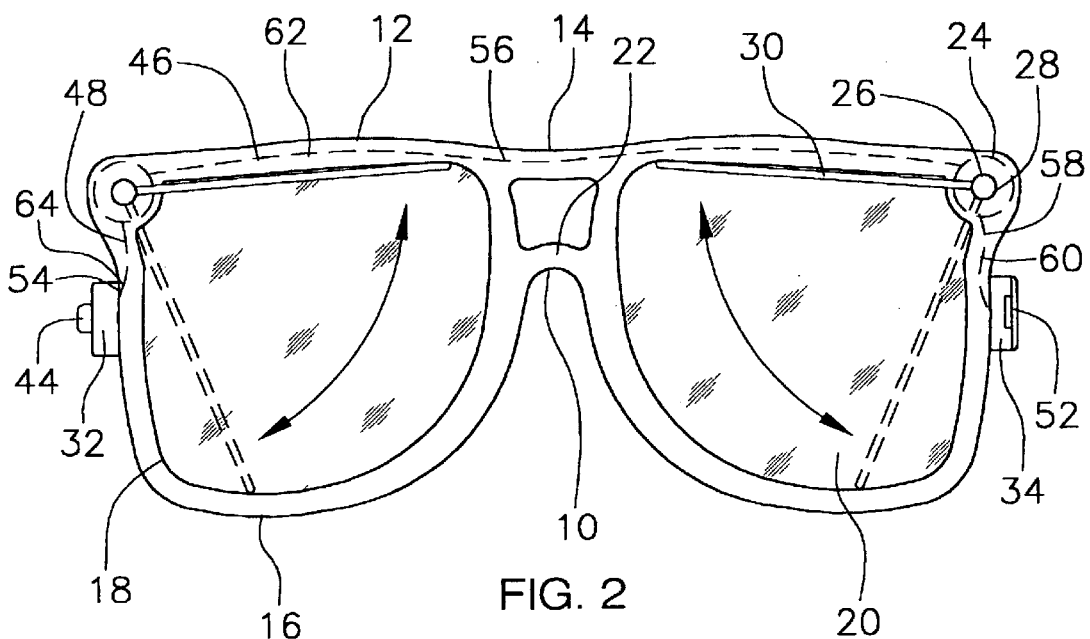
FIG. 2 is a front view of the preferred embodiment of the eyewear with attached wiping apparatus of the present invention.

In FIG. 2 the motion of said wiper arms 30 is illustrated. Said wiper arms 30 are attached to said motor shaft at a right angle. The resting position of said wiper arms 30 is at the top edge of said lenses 20. Said motor shaft rotates over a fixed angle in a back and forth motion. Said fixed angle is of a magnitude so that said wiper arm 30 traverses the entire surface of said lens 20, removing unwanted moisture or detritus from the surface of said lens. Said lens frame 12 comprises a pair of curved members 16 attached to said top beam 14 so as to define an opening 18 wherein said lenses 20 may be held. Said lens frame 12 comprises a slit adjacent to said opening 18 so that said lens 20 may be inserted into said slit and be held in place. Said lenses 20 may be prescription or tinted depending on the wearer's needs. Said motor shaft passes through a hole in said motor housing 24. Said motor 26 is seated in said motor housing 24. Said top beam is formed to comprise a passage 46. Said passage 46 passes between said motor housings 24 and is connected to the interior compartment of said motor housings. Said curve members 16 are also formed to define a passage 48 passing from said motor housings 24 to the interior cavities of said arm mounts 32 and 34. Housed in said first arm mount 32 is an On\Off switch 44 comprising an On\Off button passing through said hole in said first arm mount 32. Housed in said second arm mount 34 is a disk shaped battery 50 of the typical watch battery design. Said housing 34 comprises a detachable cover 52 attached by a snap-on design. The present invention further comprises a first wire 54 attached to said On\Off switch 44 and attached to said motor 26 in said first motor mount 24. A second wire 56 is attached to said motor 26 in said first motor mount 24 and said motor 26 in said second motor mount 24. A third wire 58 is attached to said motor 26 in said second motor mount housing 24 and said battery in said second arm mount housing 34. A fourth wire 60 is attached to said battery 50 and said second motor 26. A fifth wire 62 is attached to said second motor 26 and said first motor 26 in said first motor housing 24. A sixth wire 64 is attached to said first motor 26 and said On\Off switch 44. The result is a complete circuit when said On\Off switch 44 is activated allowing said battery 50 to supply current to said first and second motors 26. When the wearer wishes to clean her glasses 10, she presses said button to close said circuit and supply current to said motors 26. When the wearer wishes to stop said cleaning action, said button is again pressed to break said circuit.

Figure 3:
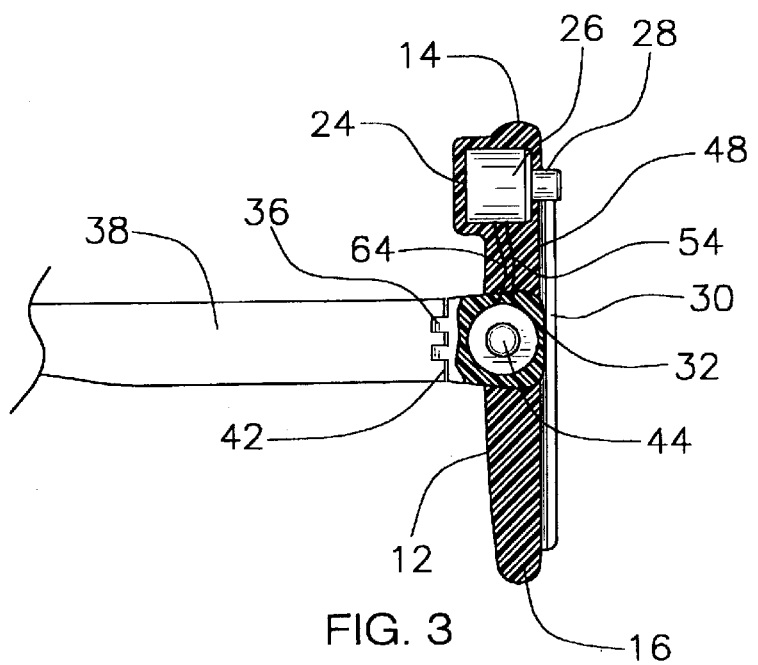
FIG. 3 is a sectional side view of the preferred embodiment of the eyewear with attached wiping apparatus of the present invention.

The sectional view of FIG. 3 is a side view of the eyewear with attached wiping apparatus 10. Said eyeglasses comprise a pair of arms 38. Said arms comprises three fingers 42 that are formed too define a hole. Said arm fingers are interlocked with a pair of fingers 36 attached to said arm mount 32 and 34. Said arm mount fingers 36 are formed to define a hole. Said holes are aligned to create a bore, which receives said axle and creates a hinge. Said arms 38 may be folded about said hinge to collapse said eyeglasses during storage. Said first arm mount 32 comprises a housing. Seated within said housing is an On\Off switch 44. Said first arm mount 32 is shaped to define a hole accessing said housing. Said button for said On\Off switch 44 passes through said hole so that the wearer may press it to activate the cleaning process. Said first wire 54 and said sixth wire 64 pass from said On\Off switch 44 to said first motor 26, supplying current. Said wires pass through said passage 48 formed in said curved members 16 between said arm mount housing 32 to said first motor housing 24. Attached to said shaft of said first motor is a wiper arm 30 at a right angle. Said wiper is held flush with the surface of said lens 20 and is swept across the surface of said lens by said motor 26.

Figure 4:
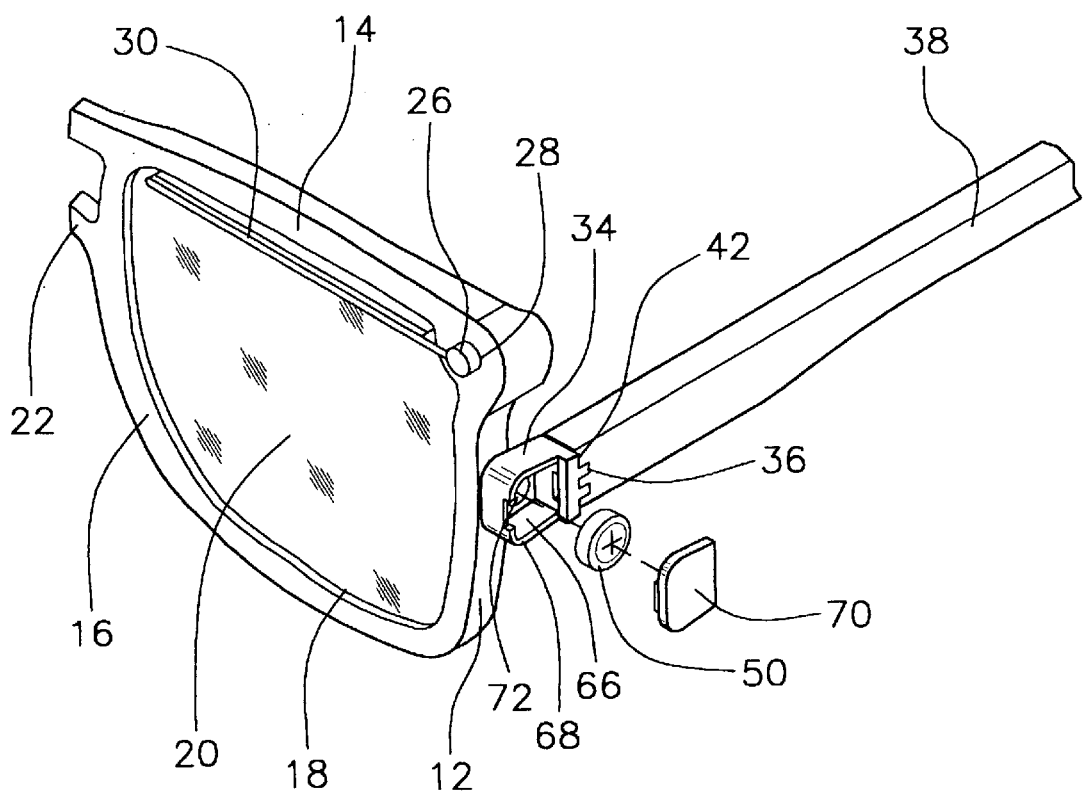
FIG. 4 is an exploded side perspective view of the eyewear with attached wiping apparatus of the present invention.

The side perspective view in FIG. 4 illustrates an exploded view of the elements of said second arm mount housing 34. The present invention comprises a second arm mount 34 attached to one of said curved members 16. Said second arm mount 34 comprises a pair of fingers 36 and is formed to define a chamber 66 and an opening 68. A standard disc shaped watch battery 50 is seated in said second arm mount 34 and a housing cover 70 is removably attached to said second arm mount 34. The wearer may remove said cover 70 and insert said battery 50. Said cover 70 is then replaced and holds said battery 50 in place. Said curved member 6 and said arm mount 34are formed to define holes connecting said chamber of said housing to said passage 48 of said curved member. Seated in said hole is a connector 72. Said connector 72 is attached to said third and fourth wires. When said On\Off switch 44 is pressed to activate the cleaning process said battery 50 supplies current to said wires which in turn relays said current to said first and second motors 26. The present invention further comprises a pair of arms 38. Said arms 38 comprise three fingers 42 which are interlocked with said pair of fingers 36 and hinged to allow the device to be folded for storage.

While a preferred embodiment of the eyewear with attached wiping apparatus 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable rigid material may be used instead of the plastics that have been described. And although the design for eyeglasses has been described, there are slight variations, such as shape and size that would make the invention appropriate for other eyewear such as goggles.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. Eyewear with attached wiping apparatus comprising:
   a pair of spectacles wherein the frame of said spectacles are formed to comprises housings located adjacent to the top outer corner of the lenses of said spectacles and wherein said spectacles are also formed to define holes passing from said housings to the front surface of said spectacles;
   a pair of motors mounted within said housings wherein said motors comprise a shaft passing through said holes in said spectacles and wherein said motors rotate said shafts periodically over a fixed acute angle; and
   a pair of arms having opposing ends with one end mounted perpendicularly to said shafts.

2. The eyewear with attached wiping apparatus of claim 1 further comprising a strip of flexible material attached to said pair of arms.

3. The eyewear with attached wiping apparatus of claim 1 wherein said frame of said spectacles are formed to define a passage between said first and said second motor.

4. The eyewear with attached wiping apparatus of claim 1 comprising a watch battery and a plurality of wires wherein said watch battery is connected to said plurality of wires and said plurality of wires are connected to said motors.

5. The eyewear with attached wiping apparatus of claim 1 wherein said frame of said spectacles is formed to define a housing on the side of one lens and wherein said spectacles are further formed to define a hole passing from said housing to the surface of said frames.

6. The eyewear with attached wiping apparatus of claim 1 wherein said frame of said spectacles is formed to define a housing on the side of one lens and wherein said spectacles are further formed to define a hole passing from said housing to the surface of said frames and wherein said eyewear with attached wiping apparatus further comprises a cover demountably held over said hole.

7. The eyewear with attached wiping apparatus of claim 1 comprising a typical de-circuit electrical On\Off switch and a plurality of wires connected to said On\Off switch wherein said plurality of wires are connected to said motors.

8. Eyewear with attached wiping apparatus comprising:
   a pair of goggles wherein the frame of said goggles are formed to comprises housings located adjacent to the top outer corner of the lenses of said goggles and wherein said goggles are also formed to define holes passing from said housings to the front surface of said goggles;
   a pair of motors mounted within said housings wherein said motors comprise a shaft passing through said holes in said goggles and wherein said motors rotate said shafts periodically over a fixed acute angle; and
   a pair of arms having opposing ends with one end mounted perpendicular to said shafts.

9. The eyewear with attached wiping apparatus of claim 8 further comprising a strip of flexible material attached to said pair of arms.

10. The eyewear with attached wiping apparatus of claim 8 wherein said frame of said goggles is formed to define a passage between said first and said second motor.

11. The eyewear with attached wiping apparatus of claim 8 comprising a watch battery and a plurality of wires wherein said watch battery is connected to said plurality of wires and said plurality of wires are connected to said motors.

12. The eyewear with attached wiping apparatus of claim 8 wherein said frame of said goggles is formed to define a housing on the side of one lens and wherein said goggles are further formed to define a hole passing from said housing to the surface of said frames.

13. The eyewear with attached wiping apparatus of claim 8 wherein said frame of said goggles is are formed to define a housing on the side of one lens and wherein said goggles are further formed to define a hole passing from said housing to the surface of said frames and wherein said eyewear with attached wiping apparatus further comprise a cover demountably held over said hole.

14. The eyewear with attached wiping apparatus of claim 8 comprising a typical de-circuit electrical On\Off switch and a plurality of wires connected to said On\off switch wherein said plurality of wires are connected to said motors.

* * * * *